US011323237B2

(12) United States Patent
Wang et al.

(10) Patent No.: US 11,323,237 B2
(45) Date of Patent: May 3, 2022

(54) REPEATER AND SYNCHRONIZATION METHOD FOR THE SAME

(71) Applicant: WISTRON NEWEB CORPORATION, Hsinchu (TW)

(72) Inventors: Chia-Hsiang Wang, Hsinchu (TW); Chieh-Wen Cheng, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 227 days.

(21) Appl. No.: 16/747,626

(22) Filed: Jan. 21, 2020

(65) Prior Publication Data

US 2021/0226762 A1 Jul. 22, 2021

(51) Int. Cl.
*H04W 4/00* (2018.01)
*H04L 5/14* (2006.01)
*H04W 72/04* (2009.01)
*H04W 56/00* (2009.01)
*H04W 84/04* (2009.01)

(52) U.S. Cl.
CPC ............. *H04L 5/14* (2013.01); *H04W 56/001* (2013.01); *H04W 72/042* (2013.01); *H04W 72/0413* (2013.01); *H04W 72/0446* (2013.01); *H04W 84/047* (2013.01)

(58) Field of Classification Search
CPC ...... H04W 84/047; H04W 56/001; H04L 5/14
See application file for complete search history.

(56) References Cited

U.S. PATENT DOCUMENTS

2019/0229798 A1* 7/2019 Tango ................. H04B 7/14
2021/0083759 A1* 3/2021 Hanson ............ H04B 7/15557

* cited by examiner

*Primary Examiner* — Bo Hui A Zhu
(74) *Attorney, Agent, or Firm* — McClure, Qualey & Rodack, LLP

(57) ABSTRACT

A repeater and a synchronization method for the same are provided. The synchronization method includes: configuring a base station to transmit an input signal during downlink transmission durations according to a time division duplex (TDD) configuration, in which the TDD configuration defines a predetermined pattern composed of an uplink transmission duration and a downlink transmission duration; configuring a processor generate a received signal code according to the input signal; configuring the processor to sample the received signal code by using a signal window to generate a target pattern; configuring the processor to dynamically compare the target pattern with the predetermined pattern according to the TDD configuration, positions of the received downlink transmission durations and positions of the received uplink transmission durations stored in a memory of the repeater, and determine whether the target pattern matches to the predetermined pattern.

18 Claims, 8 Drawing Sheets

REPEATER AND SYNCHRONIZATION METHOD FOR THE SAME

FIELD OF THE DISCLOSURE

The present disclosure relates to a repeater and a synchronization method for the same, and more particularly to a repeater and a synchronization method for the same that enable the repeater operating in a time division duplex (TDD) mode to synchronize with the information received from the base station using a predetermined TDD configuration.

BACKGROUND OF THE DISCLOSURE

A repeater is a bidirectional amplifier used to improve UE reception and address coverage issues. The repeater not only performs power amplification on signals from base stations (eNodeBs or gNodeBs) or a user equipment (UE), but also uses a duplexer option for specific band signals. After the signals are amplified, the repeater will continue to transmit the original signal.

For a communication system, synchronization is an important but often overlooked issue. Considering the communication system based on a transmission and reception scheduling mechanism, the user equipment (UE) and the base station (eNB or gNB) must be able to be synchronized to avoid interferences from the user equipment at the same time through the scheduling mechanism. If there is no synchronization mechanism, the scheduling mechanism will also fail in the communication system.

Traditionally, in order to achieve the synchronization between the user equipment (UE) and the base station (eNB or gNB) in an existing communication system, the UE needs to detect a primary synchronization signal (PSS) in order to obtain a frame timing, predict a carrier frequency offset and recognize that a physical layer cell identity (PCI) has completed the synchronization process.

Therefore, when the signals are repeated by the repeater, synchronization is also an important task for the repeater.

SUMMARY OF THE DISCLOSURE

In response to the above-referenced technical inadequacies, the present disclosure provides a repeater and a synchronization method for the same that enable the repeater operating in a time division duplex (TDD) mode to synchronize with the information received from the base station using a predetermined TDD configuration.

In one aspect, the present disclosure provides a synchronization method for a repeater in a communication system including a base station, which transmits an input signal including a periodical synchronization signal during downlink transmission durations according to a time division duplex (TDD) configuration, and the TDD configuration defining a predetermined pattern composed of an uplink transmission duration and a downlink transmission duration, and a position of the periodical synchronization signal in the downlink transmission duration. The synchronization method includes: configuring a receiver of a repeater to receive the input signal from the base station; configuring a processor to generate a received signal code according to the input signal, wherein the received signal code has an input pattern composed of received uplink transmission durations and received downlink durations, and the each of the received downlink transmission durations has a received synchronization signal; configuring the processor of the repeater to sample the received signal code by using a signal window to generate a target pattern, wherein a length of the target pattern corresponds to a length of the predetermined pattern; configuring the processor to dynamically compare the target pattern with the predetermined pattern according to the TDD configuration, positions of the received downlink transmission durations and positions of the received uplink transmission durations stored in a memory of the repeater, and determine whether the target pattern matches to the predetermined pattern. If the target pattern is determined to match to the predetermined pattern, the processor is configured to calculate a timing offset according to a position of the target pattern in the received input signal; configuring the processor to generate a regenerated signal according to the timing offset; and configuring a transmitter of the repeater to transmit the regenerated signal to a user equipment.

In another aspect, the present disclosure provides a repeater for repeating an input signal including a periodical synchronization signal during downlink transmission durations transmitted by a base station according to a time division duplex (TDD) configuration, the TDD configuration defining a predetermined pattern composed of an uplink transmission duration and a downlink transmission duration and a position of the periodical synchronization signal in the downlink transmission duration, and the repeater includes a memory, a receiver, a processor and a transmitter. The memory is configured to store the TDD configuration, and the receiver is configured to receive the input signal from the base station. The processor is configured to: generate a received signal code when the input signal is received, wherein the received signal code has an input pattern composed of received uplink transmission durations and received downlink durations, and each of the received downlink transmission durations have a received synchronization signal; sample the input pattern by using a signal window to generate a target pattern, wherein a length of the target pattern corresponds to a length of the predetermined pattern; and dynamically compare the target pattern with the predetermined pattern according to the TDD configuration, positions of the received downlink transmission durations and positions of the received uplink transmission durations, and determine whether the target pattern matches to the predetermined pattern. If the target pattern is determined to match to the predetermined pattern, the processor is configured to calculate a timing offset according to a position of the target pattern in the received input signal, generate a regenerated signal according to the timing offset, and the transmitter is configured to transmit the regenerated signal to a user equipment.

Therefore, the present disclosure provides a repeater and a synchronization method for the same utilizing a new correction algorithm, which allows the repeater operated in a TDD mode to synchronize with information received from a base station (e.g., eNB or gNB) by using a predetermined TDD configuration. By utilizing the pattern matching algorithm, a signal offset can be calculated, and then the predetermined TDD configuration and the signal offset can be further used to generate a regenerated signal according to the downlink and uplink transmission durations of the base station. Furthermore, switching control signals can also be generated according to the timing offset by the processor to enable and disable the uplink circuit and the downlink circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
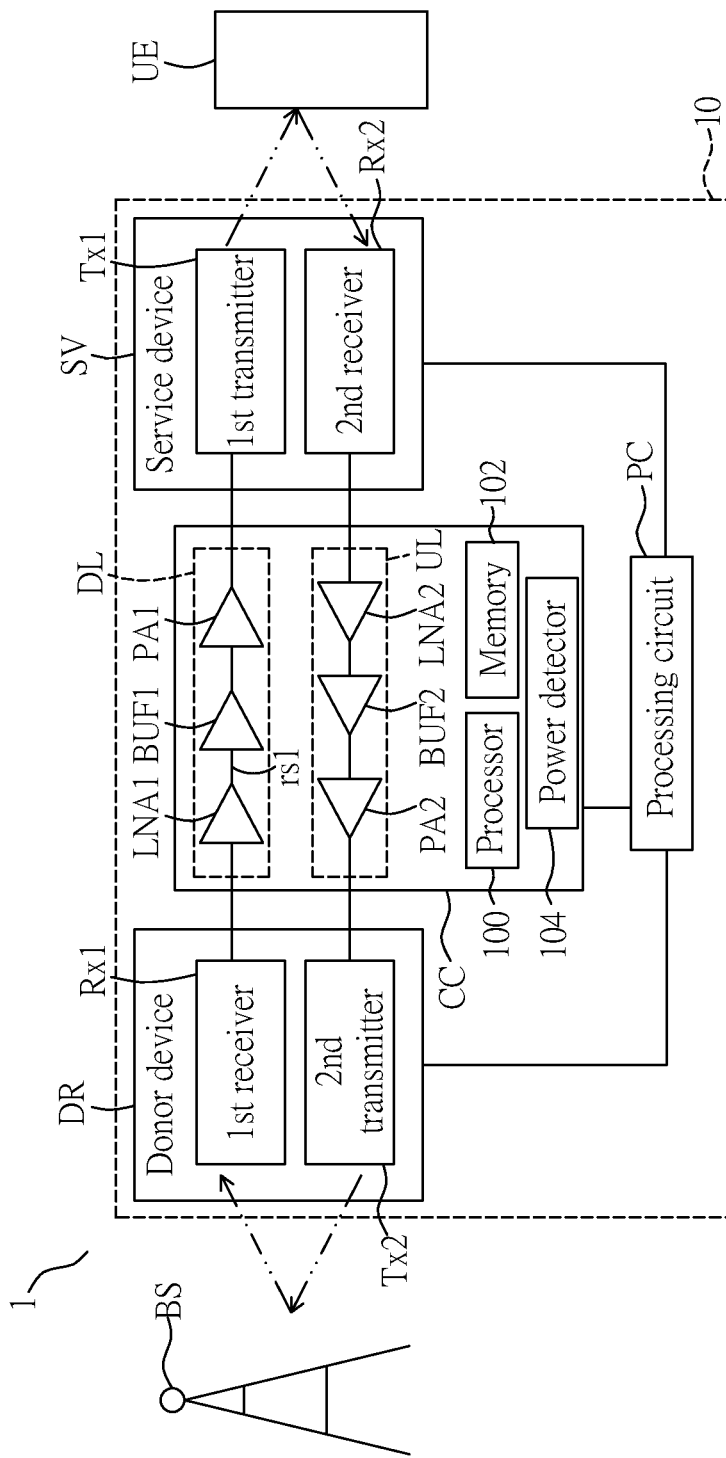
FIG. 1 is a block diagram of a communication system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure provides a repeater and a synchronization method for the same utilizing a new correction algorithm, which allows the repeater operated in a TDD mode to synchronize with information received from a base station (e.g., eNB or gNB) by using a predetermined TDD configuration. By utilizing the correction algorithm, a signal offset can be calculated, and then the predetermined TDD configuration and the signal offset can be further used to generate downlink and uplink switching control signals.

Figure 2:
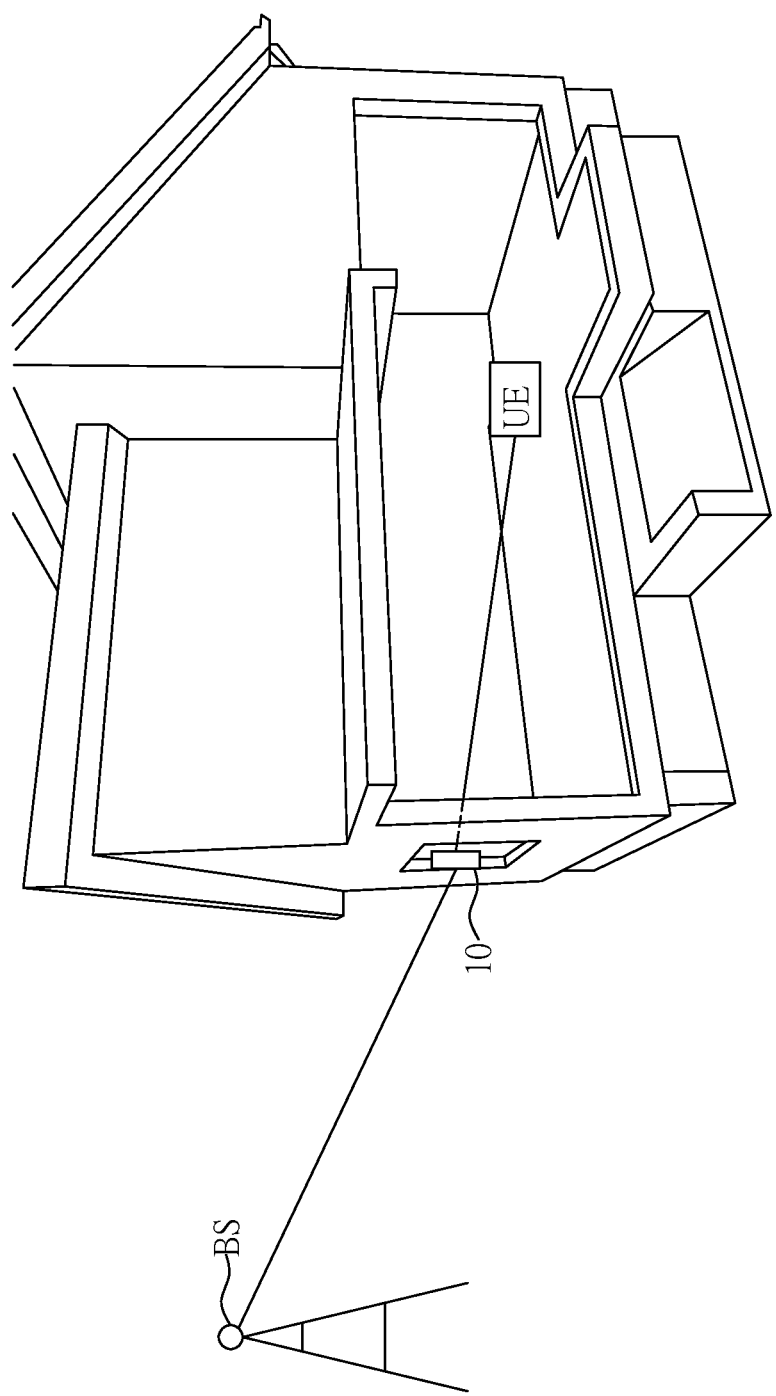
FIG. 2 is a schematic view showing a typical usage scenario of a repeater according to an embodiment of the present disclosure.

FIG. 1 is a block diagram of a communication system according to an embodiment of the present disclosure, and FIG. 2 is a schematic view showing a typical usage scenario of a repeater according to an embodiment of the present disclosure. Referring to FIGS. 1 and 2, the present disclosure provides a communication system 1 including a base station BS, a repeater 10, and a user equipment UE. As shown, the repeater 10 further includes a first receiver Rx1, a first transmitter Tx1, a second receiver Rx2, a second transmitter Tx2, a control board circuit CC, and a processing circuit PC.

The first receiver Rx1 and the second transmitter Tx2 can be included in a donor device DR, and the first transmitter Tx1 and the second receiver Rx2 can be included in a service device SV.

As can be seen from FIG. 2, a direct path of transmission between a base station BS, and a user equipment UE is blocked by an obstacle, such as a building, which results in a path loss larger than a predetermined value, the repeater 10 can be arranged to provide an alternative path between the base station BS and the user equipment UE, such that the path loss can be reduced.

In telecommunications, the user equipment UE can be any terminal and associated equipment located at a subscriber's premises and connected with a carrier's telecommunication circuit at a demarcation point. The demarcation point is a point established in a building or complex to separate customer equipment from the equipment located in either the distribution infrastructure or central office of the communications service provider. The customer premise equipment CPE may include various types of terminal equipment to process received signals to thereby enable subscribers to access to the services.

In some embodiments, the donor device DR can further include an antenna controller configured to control antenna arrays of the first receiver Rx1 and the second transmitter Tx2 to receive and transmit data from and to the base station BS, and the antenna controller in the donor device DR can receive commands from the processor PC to configure phase and gain to control the antenna arrays of the first receiver Rx1 and the second transmitter Tx2.

Similarly, the service device SV can include another antenna controller configured to control antenna arrays of the first transmitter Tx1 and the second receiver Rx2 to receive and transmit data from and to the user equipment UE, and the another antenna controller in the service device SV can receive commands from the processor PC to configure phase and gain to control the antenna arrays of the first transmitter Tx1 and the second receiver Rx2.

Further, the control board circuit CC includes a processor 100, a memory 102, a power detector 104, and a downlink circuit DL coupled to the first receiver Rx1 and the first transmitter Tx1, and an uplink circuit UL coupled to the second receiver Rx2 and the second transmitter Tx2.

The user equipment UE may communicate with the base station BS via the downlink circuit DL and the uplink circuit UL. A downlink transmission using the downlink circuit DL refers to a communication link from the base station BS to the user equipment UE, and an uplink transmission using the uplink circuit UL refers to a communication link from the user equipment UE to the base station BS. Specifically, receiving and transmitting communication technologies utilizing the downlink circuit DL and the uplink circuit UL can be provided with Frequency Division Duplex (FDD) and Time Division Duplex (TDD), and the present disclosure mainly addresses a synchronization issue for the TDD.

In more detail, for the communication system 1 including the repeater 10, the base station BS and the user equipment UE, a duration of data transmission therebetween is divided into uplink transmission durations and down link transmission durations in the TDD, and the repeater 10 can organize the uplink transmission durations and down link transmission durations according to a TDD configuration.

Specifically, the TDD configuration defines a predetermined pattern composed of an uplink transmission duration and a downlink transmission duration. Moreover, in order to achieve the synchronization between the user equipment UE and the base station BS in the communication system 1, the user equipment UE needs to detect a primary synchronization signal (PSS) in order to obtain a frame timing, predict a carrier frequency offset and recognize that a physical layer cell identity (PCI) has completed the synchronization process.

Furthermore, the base station BS and the repeater 10 can be configured to store the TDD configuration, thereby enabling the base station BS and the repeater 10 to be communicated with each other.

Therefore, the base station BS can be configured to transmit an input signal including a periodical synchronization signal during downlink transmission durations according to the TDD configuration.

Figure 3:
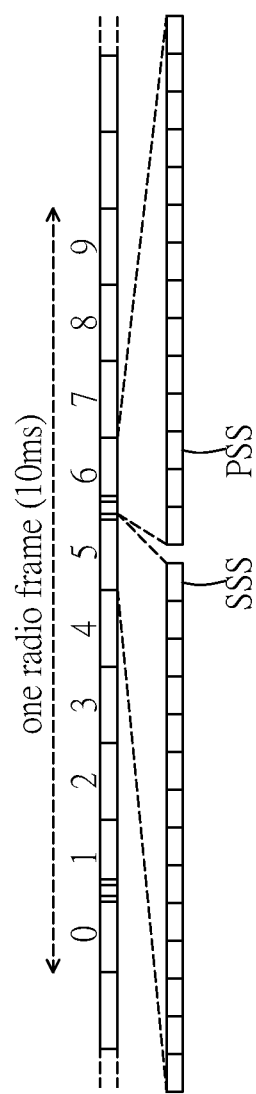
FIG. 3 shows an exemplary frame structure of the input signal transmitted based on the TDD configuration according to an embodiment of the present disclosure.

FIG. 3 shows an exemplary frame structure of the input signal transmitted based on the TDD configuration according to an embodiment of the present disclosure. A transmission timeline for the downlink transmission duration can be partitioned into units of radio frames. Each radio frame may have a predetermined duration (e.g., 10 milliseconds (ms)) and may be partitioned into 10 subframes with indices of 0 through 9, each subframe can be partitioned into a plurality of time slots, and each slot can be partitioned into a plurality of symbols. The periodical synchronization signal can be arranged in each of the radio frames, such as a primary synchronization signal (PSS) and a secondary synchronization signal (SSS), and a length of the PSS or SSS can be the same as a length of the time slot or the symbol.

Taking the LTE as an example, the base station BS can transmit the input signal including the PSS signal repeated every 5 ms, and the SSS signal can be further included by following closely behind the PSS. Similarly, the arrangement can be applied in 5G New Radio (NR). The PSS and SSS signal combination can serve as an identification information used to identify different base stations, called Physical Cell Identity (PCI).

Furthermore, a combination of the PSS and the SSS can both be included in the input signal as the periodical synchronization signal. Taking the LTE as an example, a combination of the PSS and the SSS can create a number of 504 identification combinations, which can be used to identify 504 of different base stations. Taking 5G NR as an example, the combination of the PSS and the SSS can create a total of 1008 identification combinations, which can be used to identify 1008 of different base stations.

In a word, the TDD configuration further defines a position of the periodical synchronization signal in the downlink transmission duration. After the base station BS transmits the input signal, the first receiver Rx1 can be configured to receive the input signal from the base station BS.

It should be noted that for preventing transmitting and receiving signals from interfering with each other, communication connections that operate in the opposite direction must be disabled. For example, during the downlink transmission durations, the uplink circuit UL responsible for the uplink transmission is disabled. Similarly, during the uplink transmission durations, the downlink circuit DL responsible for the downlink transmission is disabled, and the uplink circuit UL and the downlink circuit DL can be controlled by the processor.

Reference is made back to FIG. 1, the processor 100 in the repeater 10 can be coupled to the downlink circuit DL and the uplink circuit UL, and configured to generate a received signal code when the input signal is received.

In more detail, before the base station BS (e.g., gNodeB or eNodeB) and the repeater 10 are synchronized, common information that the base station BS and the repeater 10 have is the TDD configuration. The repeater 10 will receive signals in a frequency band being the same as those of the base station BS and the user equipment UE after a system initialization, and sources of the signal are signals from the base station BS and the user equipment UE.

Since the signal from the base station BS needs to be transmitted to an area that the base station BS responsible for, energy of the transmitted signal will be larger. Therefore, the received input signal from the base station BS is encoded as 1 by the processor 100.

Moreover, in a TDD system, when the user equipment UE broadcasts a signal, the base station BS will not send a signal. Therefore, the received signal from the user equipment UE is encoded as 0 by the processor 100.

Since the periodical synchronization signal (PSS/SSS/PBCH) of the base station BS will be periodically transmitted in the responsible area and will be defined to be located at a specific position in the downlink transmission duration of the TDD configuration, the positions of the periodical synchronization signal and the uplink transmission duration are used as primary features for identification.

In the present embodiment, the received signal code has an input pattern composed of received uplink transmission durations and received downlink durations, and each of the received downlink transmission durations has a received synchronization signal.

Figure 4:
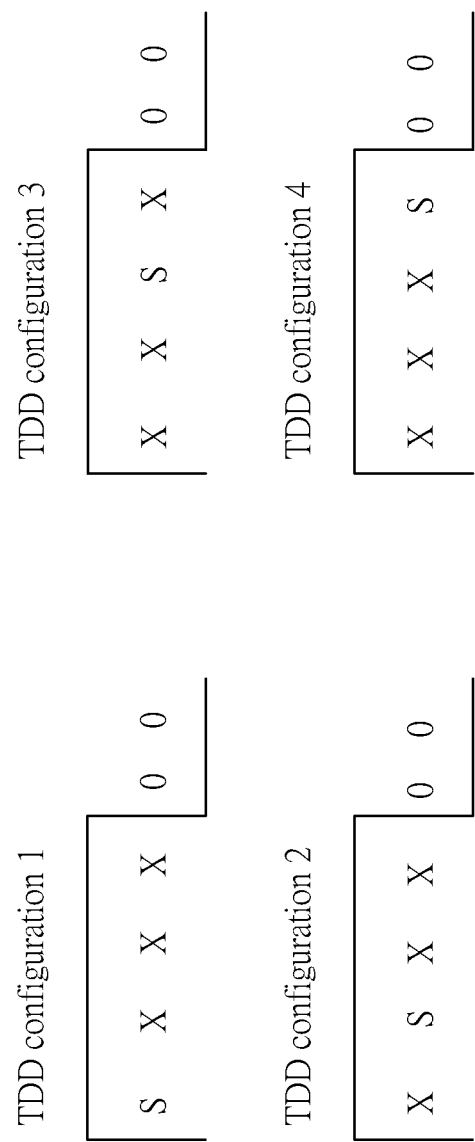
FIG. 4 shows examples the predetermined pattern of the TDD configuration represented by input codes according to an embodiment of the present disclosure.

Reference is made to FIG. 4, which shows examples the predetermined pattern of the TDD configuration represented by input codes according to an embodiment of the present disclosure.

As shown in FIG. 4, the predetermined pattern includes a plurality of first units, and the uplink transmission duration occupies a first number of first units and the downlink transmission duration occupies a second number of first units. For example, each first unit can be a time slot or a symbol of the radio frame, as shown in the examples of FIG. 3, and the uplink transmission duration occupies 2 of first units and the downlink transmission duration occupies 4 of first units in FIG. 4.

Furthermore, a symbol S represents the periodical synchronization signal, and since the periodical synchronization signal is a signal sent by the base station BS, the signal code is encoded as 1 by the processor 100 and represented by higher thick lines in FIG. 4. After a position of the periodical synchronization signal is set, symbols X can be further used to represent signals other than the periodical synchronization signal. Although the symbols X corresponding to the rest positions of the downlink transmission durations represented by the higher thick lines in the present embodiment. That is to say, durations of the symbols X can be 1 which means the repeater 10 received data from the base station BS. Also, X can be 0 which means the repeater 10 doesn't receive data from the base station BS or the power of the received data is lower than a threshold.

Furthermore, symbols 0 represent the uplink transmission durations, in which the signal is received from the user equipment UE, and the symbols 0 is also represented by lower thick lines in FIG. 4. Specifically, a length of the predetermined pattern is designed as a length of 6 time slots or symbols in one time frame, but the present disclosure is not limited thereto.

After the receive input signal is encoded by the processor 100 to generate the received signal code, the processor 100 further samples the input pattern by using a signal window to generate a target pattern.

Figure 5:
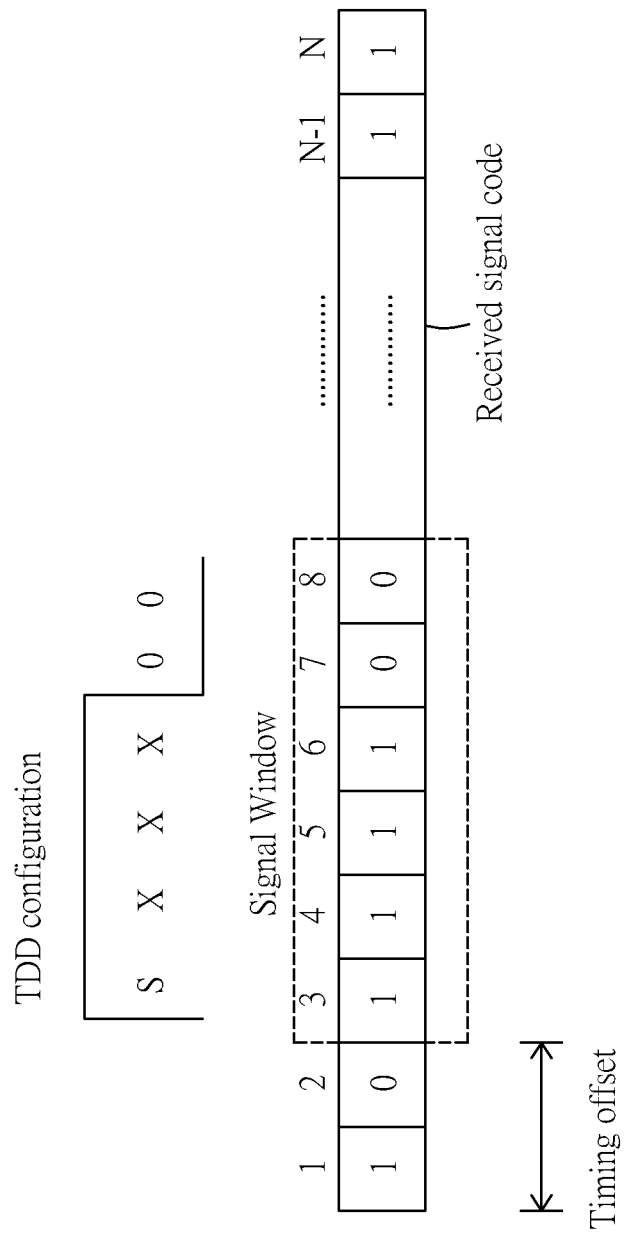
FIG. 5 is a schematic diagram showing an example of the predetermined pattern of the TDD configuration, the received signal code and the signal window according to an embodiment of the present disclosure.

Reference can be made to FIG. 5, which is a schematic diagram showing an example of the predetermined pattern of the TDD configuration, the received signal code and the signal window according to an embodiment of the present disclosure.

As shown in FIG. 5, a length of the signal window is equal to the length of the predetermined pattern of the TDD configuration. In the present embodiment, the target pattern is sampled by the signal window to obtain pattern including received signal code 111100, and the length of the target pattern corresponds to a length of the predetermined pattern, accordingly.

Since the input signal is continuously received by the first receiver Rx1 and continuously sampled by the processor 100, after the target pattern is sampled, the processor can further dynamically compare the target pattern with the predetermined pattern according to the TDD configuration, positions of the received downlink transmission durations and positions of the uplink transmission durations, and determine whether the target pattern matches to the predetermined pattern. In more detail, when the positions of the received uplink transmission durations in the target pattern are determined to be the same as positions of the uplink transmission durations in the predetermined pattern, and the position of the received synchronization signal in the target pattern is determined to be the same as the position of the periodical synchronization signal in the predetermined pattern, the target pattern is determined to match to the predetermined pattern since the TDD configuration is known by the base station BS and the repeater 10.

For example, the received signal code in FIG. 5 includes N entries of data, which are represented by first codes corresponding to the received downlink transmission durations, for example, 0 and 1, and second codes corresponding to the received uplink durations, for example, 0, respectively. Numbers located at the upper part of the figure represents index of the entries. For the first six entries of the received signal code, the sampled target pattern should be 101111, which is compared with the predetermined pattern, that is, SXXX00, in which the first codes occupied by the downlink transmission duration and last two codes occupied by the uplink transmission duration. In more detail, the predetermined pattern SXXX00 of the TDD configuration sets a limitation that the first code of the first codes must be 1 and the last two codes must be 0, and the limitation can be used to determine whether the target pattern matches to the predetermined pattern.

Similarly, if the predetermined pattern of the TDD configuration is XSXX00, a limitation that the second code of the first codes must be 1 and the last two codes must be 0 is set, and the limitation can also be used to determine whether the target pattern matches to the predetermined pattern. In other embodiments, the predetermined pattern of the TDD configuration can be set as XXSX00 or XXXS00, the present disclosure is not limited thereto.

Therefore, since the fifth and the sixth codes of the target pattern 101111 does not match to corresponding codes of the predetermined pattern SXXX00, the processor 100 determines that the firstly sampled target pattern does not match to the predetermined pattern.

For the third to eighth entries of the received signal code, the sampled target pattern should be 111100, which is compared with the predetermined pattern, that is, SXXX00 with the first code of the first codes occupied by the downlink transmission duration and the second codes, i.e., the last two codes, occupied by the uplink transmission duration. Therefore, since the first code and the last two codes of the target pattern matches to corresponding codes of the predetermined pattern, the processor 100 determines that the sampled target pattern including the third to eighth entries of the received signal code matches to the predetermined pattern. It should be noted that the second to the fourth codes of the target pattern can be omitted since the predetermined pattern of the TDD configuration is SXXX00.

In response to the target pattern being determined to match to the predetermined pattern, the processor 100 can be further configured to calculate a timing offset according to a position of the target pattern in the received input signal. For example, the timing offset can be obtained from FIG. 5, and it can be seen that the timing offset equals to a duration of two time slots or symbols of one time frame.

Since the timing offset is obtained, a precise timing when the base station BS starts to enter the downlink duration to transmit signals can be realized by the repeater 10, therefore, the processor 100 can generate a regenerated signal according to the timing offset, and the first transmitter Tx1 of the repeater 10 can transmit the regenerated signal to the user equipment UE during the downlink transmission durations utilized by the base station BS.

Reference can be made back to FIG. 1, the repeater further includes a power detector 104 configured to detect an intensity of the received input signal to generate the received signal code.

In more detail, the power detector 104 can be coupled to the downlink circuit DL to detect the intensity of the received input signal rs1 transmitted in the downlink circuit DL. It should be noted that the downlink circuit DL can include a first low noise amplifier LNA1 coupled to the first receiver Rx1, a first buffer circuit BUF1 coupled to the first low noise amplifier LNA1, and a first power amplifier PA1 coupled between the first buffer circuit BUF1 and the first transmitter Tx1.

Similarly, the uplink circuit UL can include a second low noise amplifier LNA2 coupled to the second receiver Rx2, a second buffer circuit BUF2 coupled to the second low noise amplifier LNA2, and a second power amplifier PA2 coupled between the second buffer circuit BUF2 and the second transmitter Tx2.

In the present embodiment, the processor 100 can be coupled to the power detector 104 and further includes a threshold logic circuit. When the intensity of the received input signal rs1 exceeds a predetermined intensity, the processor 100 can generate downlink codes indicating positions of the received downlink transmission durations in the received signal code, for example, the symbol 1 defined above. In response to the intensity being smaller than the determined intensity, the processor 100 can generate uplink codes indicating positions of the received uplink receiving durations in the received signal code, for example, the symbol 0 defined above.

Figure 6:
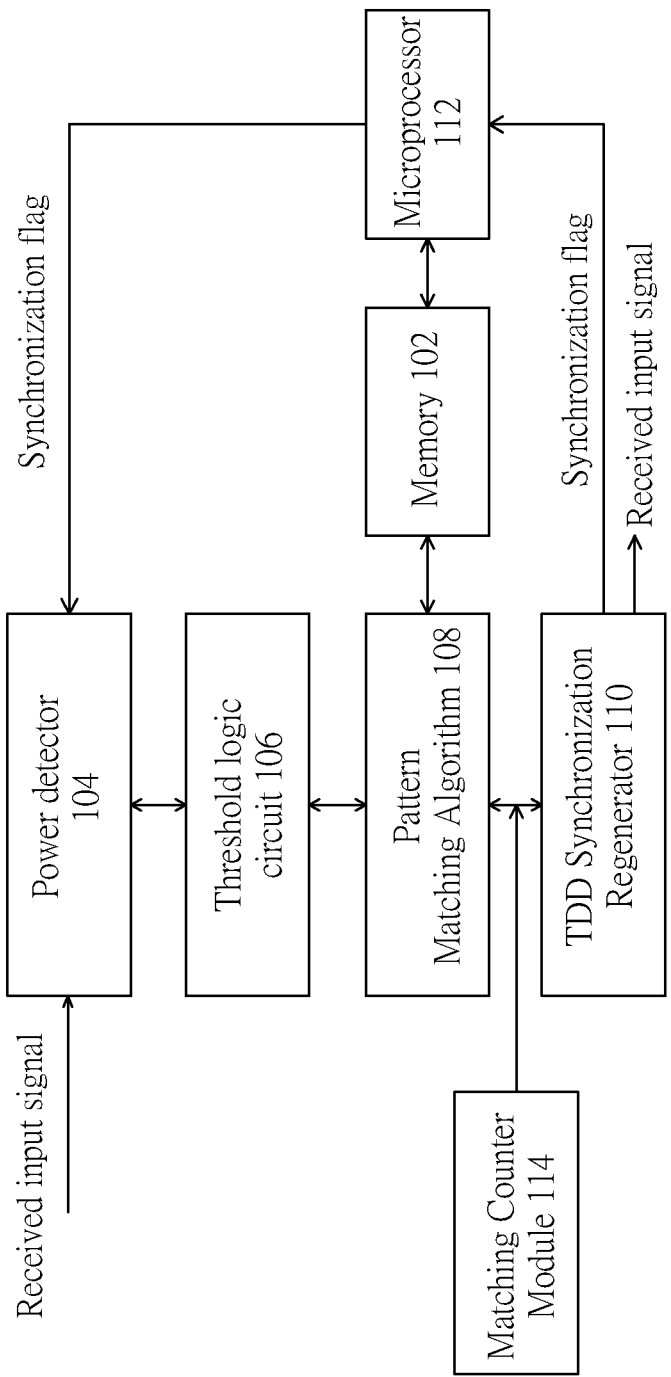
FIG. 6 is a block diagram of the synchronization program according to an embodiment of the present disclosure.

Therefore, the processor 100 and the power detector 104 can be implemented by executing a synchronization program by the processor 100. Reference can be made to FIG. 6, which is a block diagram of the synchronization program according to an embodiment of the present disclosure.

As shown in FIG. 6, the synchronization program can include the power detector 104, a threshold logic circuit 106, a pattern matching algorithm 108, a TDD synchronization regenerator 110, a memory 102, a microprocessor 112 and a matching counter module 114. The power detector 104 can be used to detect the intensity of the received input signal rs1 transmitted in the downlink circuit DL, the threshold logic circuit 106 can be used to determine whether the intensity of the received input signal rs1 exceeds the first or second predetermined intensity, thereby generating the received signal code by utilizing the downlink codes, the uplink codes and synchronization codes.

The pattern matching algorithm 108 can be used to compare the received signal code with the predetermined pattern as mentioned above. In the present embodiment, the matching counter module 114 can be further included in the repeater 10 to generate count values during the repeater 10 is generating the received input signal code.

Figure 7:
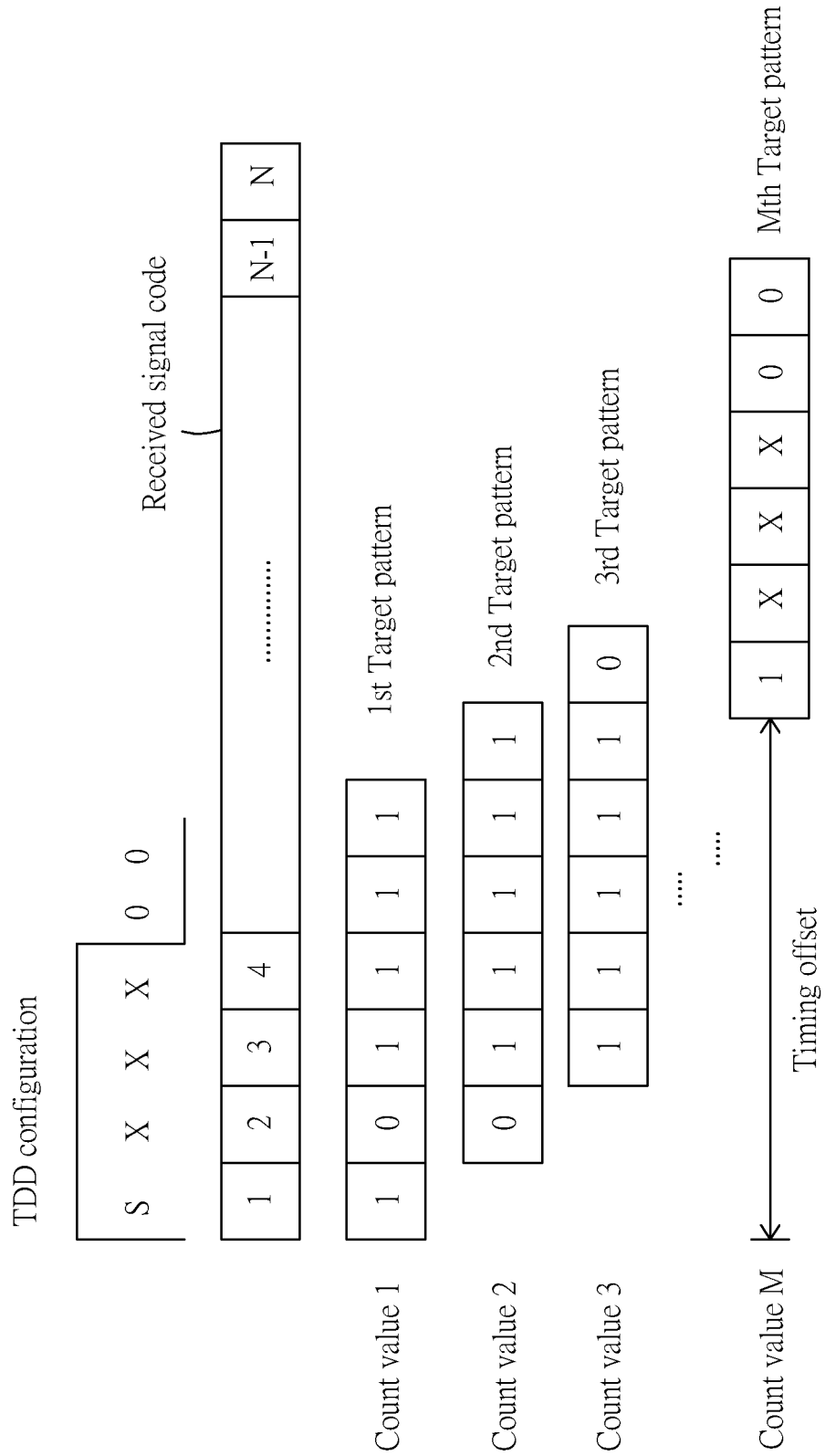
FIG. 7 shows an example of an operation of the matching counter module according to an embodiment of the present disclosure.

Reference is made to FIG. 7, which shows an example of an operation of the matching counter module according to an embodiment of the present disclosure. As shown in FIG. 7, given the predetermined pattern is "SXXX00", the matching counter module 114 starts to count when (the threshold logic circuit 106 of) the processor 100 starts to generate the received signal code, that is, a count value starts from 0 at this time. When the received signal code is sampled by the signal window to generate a first target pattern, the count value adds 1, until the Mth target pattern is determined to match to the predetermined pattern (for example, 1XXX00, X can be 0 or 1) while the count value being M, the processor 100 can calculate the timing offset according to the count value M corresponding to a starting point of the target pattern.

After the timing offset is obtained, the TDD synchronization regenerator 110 can generate the regenerated signal according to the timing offset, and the first transmitter Tx1 of the repeater 10 can transmit the regenerated signal to the user equipment UE during the downlink transmission durations utilized by the base station BS.

In addition, the TDD synchronization regenerator 110 also generates a synchronization flag for indicating that the repeater 10 is synchronized with the base station BS. In this case, the memory 102 and the microprocessor 112 also participate in the process mentioned above, and the microprocessor 112 can control the power detector 104 to stop the detection according to the synchronization flag.

Figure 8:
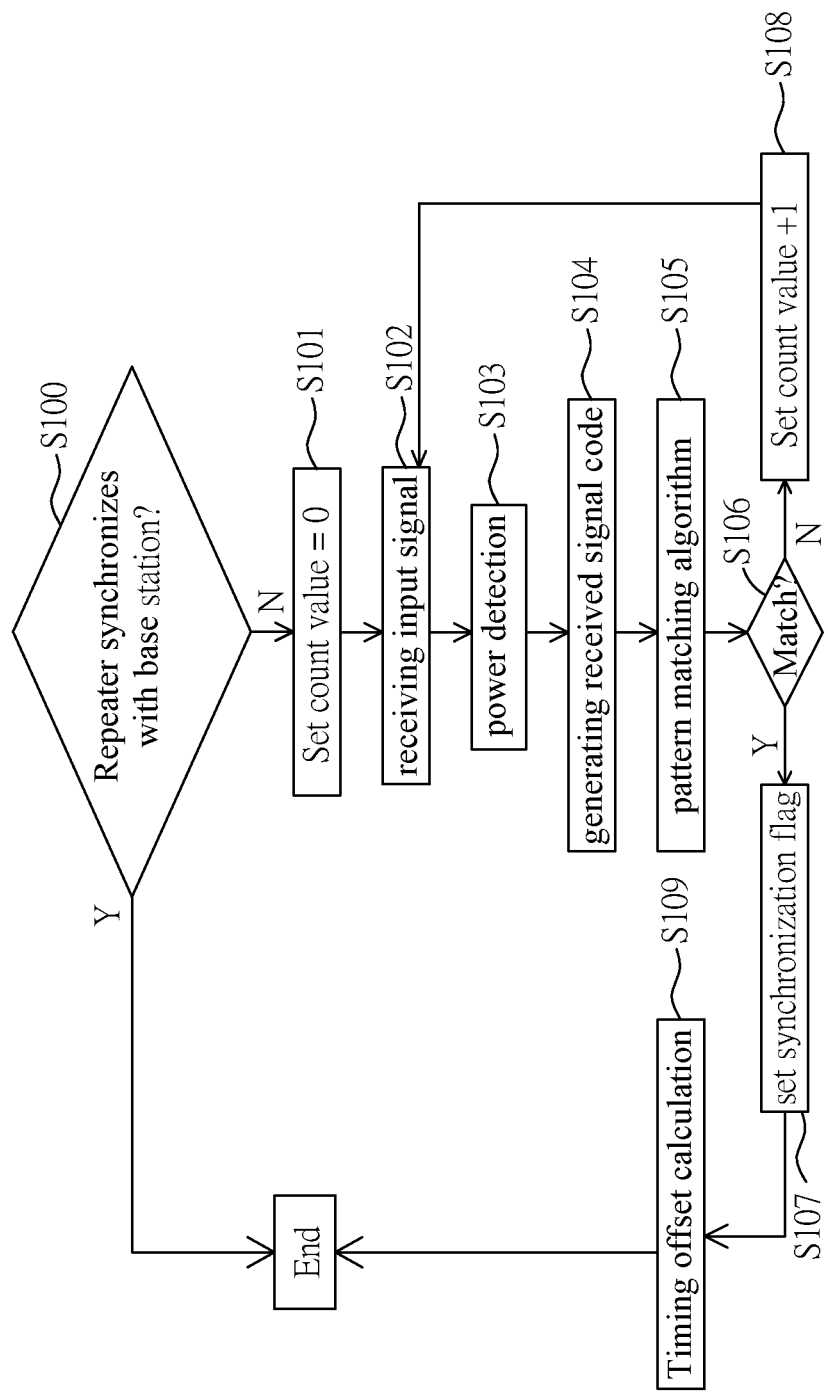
FIG. 8 is a flowchart of a synchronization method for a repeater according to an embodiment of the present disclosure.

According to the above descriptions, a synchronization method for the repeater used by the present disclosure can be arranged as a flowchart depicted in FIG. 8.

Reference is made to FIG. 8, the synchronization method for the repeater includes the following steps:

Step S100: determining whether the repeater is synchronized with the base station according to the synchronization flag, if yes, the method proceeds to the end, if not, the method proceeds to step S101.

Step S101: configuring a matching counter module of the repeater to generate count values during the repeater is generating the received input signal code. That is, the matching counter module 114 sets the count value to 0 and starts to count.

Step S102: receiving the input signal.

Step S103: detecting the intensity of the received input signal by the power detector.

Step S104: generating the received signal code. The received signal code can be generated by using the power detector 104 and the threshold logic circuit 106 as mentioned above, and the repeated descriptions are omitted hereinafter.

Step S105: executing pattern matching algorithm to sample the received signal code to generate the target pattern to be compared with the predetermined pattern.

Step S106: determining whether the target pattern matches to the predetermined pattern, if so, the method proceeds to step S107, if not, the method proceeds to step S108 to set the count value to add 1, and the method returns to step S102.

Step S107: setting the synchronization flag for indicating that the repeater is synchronized with the base station.

Step S109: calculating the timing offset according to the count value. The timing offset can be used to generated the regenerated signal, and the method proceeds to the end.

In certain embodiments for the pattern matching algorithm, AND operation and XOR operation can be used to achieve the comparison between the target pattern and the predetermined pattern.

For example, the following program codes are provided:
"SS 32 Signal Window AND SS Masking SS Result=SS XOR SS Masking"

In the above program codes, "Signal Window" represents that the received signal codes are sampled by a length of the TDD pattern, "SS Masking" represents a position of the periodical synchronization signal in the predetermined pattern, "SS" is a result generated by using AND operation on "Signal Window" and "SS Masking", and "SS Result" is a result generated by using XOR operation on "SS" and "SS Masking".

In a case, given the predetermined pattern of the TDD configuration is "SXXX00", "Signal Window" is "111100". Since "SS Masking" is used to determine whether the target pattern has a correct code on the position of the synchronization signal according to the predetermined pattern, "SS Masking" is set as "100000" to make sure that first codes of the target pattern must be 1, that is, the downlink code. When AND operation is used, "SS Masking" can be utilized to determine whether the position of the received synchronization signal in the target pattern is determined to be the same as the position of the periodical synchronization signal defined in the TDD pattern. In this case, "SS" can be obtained as "100000", that is, the target pattern has at least one received synchronization signal whose position being the same as the position of the synchronization signal defined in the TDD pattern.

Next, XOR operation in the above program code is an optional operation, which is further performed on "SS" and "SS Masking" to generate "SS Result" in a simple way for indicating the result of the previous step. In some embodiments, "SS" can be directly used to indicate the result of AND operation without using XOR operation.

After the position of the periodical synchronization signal is determined, the comparison between the target pattern and the predetermined pattern should further include a determination of the positions of the uplink transmission durations. In this case, AND operation is further performed on "Single Window" and "Uplink Masking" to obtain "Uplink Result"

for determining whether the positions of the uplink transmission durations of the target pattern are the same as the positions of the uplink transmission durations of the predetermined pattern.

For example, since the predetermined pattern of the TDD configuration is "SXXX00", "Uplink Masking" is set as "000011" for ensuring that last two codes of the target pattern must be 0, that is, the uplink code. Therefore, AND operation is performed on "Single Window" and "Uplink Masking", "Uplink Result" can be obtained as "000000", representing that the positions of the received uplink durations are as the same as the positions of the uplink transmission durations of the predetermined pattern, and "Uplink Result" can also be used to provide a simple way for indicating the result of the latter step.

In conclusion, the present disclosure provides a repeater and a synchronization method for the same utilizing a new correction algorithm, which allows the repeater operated in a TDD mode to synchronize with information received from a base station (e.g., eNB or gNB) by using a predetermined TDD configuration. By utilizing the pattern matching algorithm, a signal offset can be calculated, and then the predetermined TDD configuration and the signal offset can be further used to generate a regenerated signal according to the downlink and uplink transmission durations of the base station. Furthermore, switching control signals can also be generated according to the timing offset by the processor to enable and disable the uplink circuit and the downlink circuit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A synchronization method for a repeater in a communication system including a base station, which transmitting an input signal including a periodical synchronization signal during downlink transmission durations according to a time division duplex (TDD) configuration, the TDD configuration defining a predetermined pattern composed of an uplink transmission duration and a downlink transmission duration, and a position of the periodical synchronization signal in the downlink transmission duration, the synchronization method comprising:
   configuring a receiver of a repeater to receive the input signal from the base station;
   configuring a processor to generate a received signal code according to the input signal, wherein the received signal code has an input pattern composed of received uplink transmission durations and received downlink durations, and the each of the received downlink transmission durations has a received synchronization signal;
   configuring the processor of the repeater to sample the received signal code by using a signal window to generate a target pattern, wherein a length of the target pattern corresponds to a length of the predetermined pattern;
   configuring the processor to dynamically compare the target pattern with the predetermined pattern according to the TDD configuration, positions of the received downlink transmission durations and positions of the received uplink transmission durations stored in a memory of the repeater, and determine whether the target pattern matches to the predetermined pattern, wherein if the target pattern is determined to match to the predetermined pattern, the processor is configured to calculate a timing offset according to a position of the target pattern in the received input signal;
   configuring the processor to generate a regenerated signal according to the timing offset; and
   configuring a transmitter of the repeater to transmit the regenerated signal to a user equipment.

2. The synchronization method according to claim 1, further comprising:
   configuring a power detector of the repeater to detect an intensity of the received input signal to generate the received signal code; and
   configuring the processor to generate, when the intensity of the received input signal exceeds a predetermined intensity, downlink codes indicating positions of the received downlink transmission durations in the received signal code, otherwise generate uplink codes indicating positions of the received uplink receiving durations in the received signal code.

3. The synchronization method according to claim 2, wherein when the positions of the received uplink transmission durations in the target pattern are determined to be the same as positions of the uplink transmission durations in the predetermined pattern and the position of the received synchronization signal of the received downlink transmission durations in the target pattern is determined to be the same as the position of the periodical synchronization signal in the predetermined pattern, the target pattern is determined to match to the predetermined pattern.

4. The synchronization method according to claim 3, further comprising configuring a matching counter module of the repeater to generate count value during the repeater is generating the received input signal code.

5. The synchronization method according to claim 4, further comprising configuring the processor to calculate the timing offset according to the count value corresponding to a starting point of the target pattern when the target pattern is determined to be match with the predetermined pattern.

6. The synchronization method according to claim 1, wherein the periodical synchronization signal includes at least one of a primary synchronization signal and a secondary synchronization signal.

7. The synchronization method according to claim 1, wherein the predetermined pattern includes a plurality of first units, and the uplink transmission duration occupies a first number of first units and the downlink transmission duration occupies a second number of first units.

8. The synchronization method according to claim 7, wherein the first units are symbols or slots of a radio frame.

9. The synchronization method according to claim 7, wherein a length of the signal window corresponds to a length of the predetermined pattern, thereby generating the target pattern having a length corresponding to the length of the predetermined pattern.

10. The synchronization method according to claim 7, wherein the received signal code are represented by first codes corresponding to the received uplink transmission durations and second codes corresponding to the received downlink durations.

11. A repeater for repeating an input signal including a periodical synchronization signal during downlink transmission durations transmitted by a base station according to a time division duplex (TDD) configuration, the TDD configuration defining a predetermined pattern composed of an uplink transmission duration and a downlink transmission duration and a position of the periodical synchronization signal in the downlink transmission duration, and the repeater comprising:
 a memory, configured to store the TDD configuration;
 a receiver, configured to receive the input signal from the base station;
 a processor configured to:
 generate a received signal code when the input signal is received, wherein the received signal code has an input pattern composed of received uplink transmission durations and received downlink durations, and each of the received downlink transmission durations have a received synchronization signal; and
 sample the input pattern by using a signal window to generate a target pattern, wherein a length of the target pattern corresponds to a length of the predetermined pattern; and
 dynamically compare the target pattern with the predetermined pattern according to the TDD configuration, positions of the received downlink transmission durations and positions of the received uplink transmission durations, and determine whether the target pattern matches to the predetermined pattern; and
 a transmitter,
 wherein if the target pattern is determined to match to the predetermined pattern, the processor is configured to calculate a timing offset according to a position of the target pattern in the received input signal, generate a regenerated signal according to the timing offset, and
 wherein the transmitter is configured to transmit the regenerated signal to a user equipment.

12. The repeater according to claim 11, wherein the repeater further includes a power detector configured to detect an intensity of the received input signal to generate the received signal code, wherein the processor is configured to generate, when the intensity of the received input signal exceeds a predetermined intensity, downlink codes indicating positions of the received downlink transmission durations in the received signal code, otherwise generate uplink codes indicating positions of the received uplink receiving durations in the received signal code.

13. The repeater according to claim 12, wherein when the positions of the received uplink transmission durations in the target pattern are determined to be the same as positions of the uplink transmission durations in the predetermined pattern, and the position of the received synchronization signal of the received downlink transmission durations in the target pattern is determined to be the same as the position of the periodical synchronization signal in the predetermined pattern, the target pattern is determined to match to the predetermined pattern.

14. The repeater according to claim 13, further comprising configuring a matching counter module of the repeater to generate count values during the repeater is generating the received input signal code.

15. The repeater according to claim 14, wherein the processor is configured to calculate the timing offset according to the count value corresponding to a starting point of the target pattern when the target pattern is determined to be match with the predetermined pattern.

16. The repeater according to claim 11, wherein the predetermined pattern includes a plurality of symbols or slots, and the uplink transmission duration occupies a first number of symbols or slots and the downlink transmission duration occupies a second number of symbols or slots.

17. The repeater according to claim 16, wherein a length of the signal window corresponds to a length of the predetermined pattern, thereby generating the target pattern having a length corresponding to the length of the predetermined pattern.

18. The repeater according to claim 16, wherein the received signal code are represented by first codes corresponding to the received uplink transmission durations and second codes corresponding to the received downlink durations.

* * * * *